Patented Aug. 9, 1949

2,478,285

UNITED STATES PATENT OFFICE 2,478,285

ISOMERIZATION OF 1,4-DICYANO-2-BUTENE

Carl M. Langkammerer, Wilmington, Del., assignor to E. I. du Pont de Nemours & Company, Wilmington, Del., a corporation of Delaware No Drawing. Application July 15, 1948,
Serial No. 38,951

9 Claims. (Cl. 260—465.8)

1

This invention relates to a new process for preparing 1,4-dicyano-1-butene. More particularly, it relates to a process of preparing 1,4-dicyano-1-butene from 1,4-dicyano-2-butene.

The 1,4-dicyanobutenes have assumed considerable technical importance because of their use in the preparation of nylon ingredients such as hexamethylenediamine and of their versatility as intermediates in many other chemical syntheses. Of the two possible isomeric 1,4-dicyanobutenes, 1,4-dicyano-2-butene may be prepared by the method described in U. S. Patent 2,342,101, or by the improved methods described in a number of recently filed patent applications such as Ser. No. 768,283 (Whitman, August 12, 1947); Ser. No. 768,703 (Hager, August 14, 1947); or Ser. No. 768,705 (Farlow, August 14, 1947). It is a solid, melting at 76–78° C.

The other isomer, 1,4-dicyano-1-butene, offers advantages over 1,4-dicyano-2-butene in some respects. For example, it is a liquid at room temperature, and therefore more convenient to handle in technical processes. Moreover, it is generally more reactive because its structure, as shown by the formula

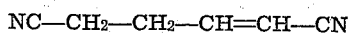

NC—CH$_2$—CH$_2$—CH=CH—CN comprises a nitrile group conjugated with an ethylenic linkage. In fact, it is capable of some reactions which are not possible with 1,4-dicyano-2-butene.

It has been proposed (application Ser. No. 756,097, filed by Hager on June 20, 1947, now Patent No. 2,451,386) to prepare 1,4-dicyano-1-butene by isomerization of 1,4-dicyano-2-butene in the presence of a hydrogenating metal such as copper or cobalt. This method gives very satisfactory yields but it is rather slow and requires separation of the isomerization catalyst by filtration and/or distillation.

An object of this invention is to provide a method of preparing 1,4-dicyano-1-butene. Another object is to provide a method of isomerizing 1,4-dicyano-2-butene to 1,4-dicyano-1-butene. A still further object is to provide a method of preparing 1,4-dicyano-1-butene rapidly and in good yields from its isomer, 1,4-dicyano-2-butene. Other objects will appear hereinafter.

These objects are accomplished by a method of isomerizing 1,4-dicyano-2-butene to 1,4-dicyano-1-butene which comprises maintaining at elevated temperature a mixture of 1,4-dicyano-2-butene with catalytic amounts of an amine having a basicity, as expressed by its pK$_a$ value at

2

20–25° C., between 6 and 12 until 1,4-dicyano-1-butene is formed.

It is known that the basicity of organic bases is best expressed by their pK$_a$ value. The expression pK$_a$ stands for the negative logarithm of the acidity constant. An excellent discussion of basicity and its measurement is given by Adrien Albert in Chemistry and Industry, for January 25, 1947, pages 51–55, citing many references. It has been found that the isomerization catalysts suitable for the process of this invention are the amines having a pK$_a$ value between 6 and 12, measured at temperatures between 20 and 25° C. The pK$_a$ value varies with the temperature, but only to a small extent which is negligible between 20 and 25° C.

It is generally desirable to use at least 0.05% by weight of amine catalyst, based on the dicyanobutene, to bring about rapid isomerization. It is disadvantageous, besides being uneconomical, to use more than about 5% of the amine because of competing reactions whereby the amine, if secondary, adds to the dicyanobutenes to give beta-tertiary aminoadiponitriles and, if primary, leads to cyclization reactions involving the amino and nitrile groups. Thus, any substantial excess of catalyst over that necessary for the reaction leads only to decreased yields of 1,4-dicyano-1-butene. This objection, however, does not apply to tertiary amines which do not react with the dicyanobutenes. A generally useful proportion of amine catalyst is between 0.08 and 2% by weight of 1,4-dicyano-2-butene.

The isomerization proceeds rather slowly at ordinary temperatures such as 15–25° C. and it is in general desirable to employ temperatures above about 50° C. The upper limit of temperature is dictated only by the decomposition point of the reactants. It may be as high as 200° C. or even higher. A generally useful temperature range is between 75° C. and 150° C.

The reaction is preferably carried out by heating at an elevated temperature the reaction mixture consisting of the 1,4-dicyano-2-butene in liquid phase contact with catalytic amounts of the specified amine without solvent. This has the advantage that separation of the reaction product is unnecessary, since if any unreacted 1,4-dicyano-2-butene is present it is in small amount and since the minute quantity of amine or addition product present does not in general interfere with the uses to which the 1,4-dicyano-1-butene may be put. Moreover, the isomerization is faster in the absence of a solvent. If desired, however, suitable neutral organic solvents such as benzene, cyclohexane, ether, ethyl acetate, and the like may be used. Even solvents such as alcohols (e. g., methanol, ethanol) which under certain conditions add to the dicyanobutenes may be used since the amines suitable as isomerization catalysts do not catalyze the addition of alcohols. The reaction mixture can also tolerate small amounts of water, up to 10–15% by weight of dicyanobutene.

At the preferred temperature range, isomerization is in general substantially complete within two hours and usually within one hour. In many cases, less than half an hour is enough. 1,4-dicyano-1-butene is obtained as a mixture of geometric isomers. The isomer to which the trans configuration is assigned boils at 84.5–86.5° C. at 0.35–0.44 mm. pressure, melts at −13 to −12° C. and has a refractive index $n_D^{25}$ between 1.4640 and 1.4652. The isomer to which the cis configuration is assigned boils at 99.5–102.5° C. at 0.38 mm. pressure, melts at −19° to −17° C. and has a refractive index $n_D^{25}$ between 1.4675 and 1.4690.

The reaction product can be separated from the catalyst and any unchanged 1,4-dicyano-2-butene by distillation, or by acid washing followed by distillation. As has already been said, it is often unnecessary to carry out any separation or purification since the crude reaction product is usable as such in many cases. To judge whether or not the reaction has proceeded to a substantial extent, it is only necessary to cool the reaction product to room temperature or, if desired, to 0° C. If the product remains liquid at this temperature and has a refractive index $n_D^{25}$ between 1.4640 and 1.4680, this is proof that all or practically all of the 1,4-dicyano-2-butene has isomerized to 1,4-dicyano-1-butene.

The invention is illustrated in greater detail in the following examples in which parts are by weight.

*Example I*

A mixture of 200 parts of 1,4-dicyano-2-butene and 2 parts of piperidine was heated at 92–95° C. for 1 hour. After standing for 16 hours the reaction mixture was washed with 150 parts of water containing 10 parts of concentrated hydrochloric acid, then with 100 parts of water. Distillation of the organic layer gave 118 parts of trans 1,4-dicyano-1-butene, $n_D^{25}$: 1.4651, and 60 parts of cis 1,4-dicyano-1-butene, $n_D^{25}$: 1.4680. The yield was 89% of the theoretical.

Isomerization also took place with one-tenth the amount of the same catalyst. A mixture of 200 parts of 1,4-dicyano-2-butene and 0.2 part of piperidine, when held at 95–100° C. for 1 hour, gave a reaction product which was liquid at room temperature and had a refractive index $n_D^{25}$: 1.4649, indicating substantially complete rearrangement.

*Example II*

A solution of 53 parts of 1,4-dicyano-2-butene and 0.5 part of piperidine in 200 parts of isobutyl alcohol was refluxed (temperature 110–115° C.) for 9 hours. A lower layer was separated and evaporated under reduced pressure to remove the solvent. There was obtained 36 parts of 1,4-dicyano-1-butene, $n_D^{25}$: 1.4646.

*Example III*

A solution of 26.5 parts of 1,4-dicyano-2-butene and 0.2 part of piperidine in 80 parts of methanol was allowed to stand for 16 hours at 20° C., then refluxed for 2 hours. Since isomerization was not complete, as shown by the presence of a small amount of crystalline solid in the mixture when cooled, an additional 0.2 part of piperidine was added and the mixture was refluxed another hour. The methanol was removed by distillation and the residue was fractionated. This gave 14 parts of trans 1,4-dicyano-1-butene, $n_D^{25}$: 1.4652, and 6.2 parts of cis 1,4-dicyano-1-butene, $n_D^{25}$: 1.4677.

*Example IV*

A mixture of 200 parts of 1,4-dicyano-2-butene and 2 parts of triethylamine was heated for 1 hour at 95–100° C. There was substantially complete rearrangement to liquid 1,4-dicyano-1-butene, $n_D^{25}$: 1.4652.

*Example V*

A mixture of 20 parts of 1,4-dicyano-2-butene and 0.2 part of morpholine was heated at 90–100° C. for 1.5 hours. This produced isomerization to liquid 1,4-dicyano-1-butene, $n_D^{25}$: 1.4642.

*Example VI*

A mixture of 20 parts of 1,4-dicyano-2-butene and 0.8 part of a 27% aqueous solution of dimethylamine was heated for 1 hour at 95–100° C. giving substantially complete conversion to liquid 1,4-dicyano-1-butene.

*Example VII*

A mixture of 200 parts of 1,4-dicyano-2-butene and 8 parts of a 25% aqueous solution of monomethylamine was heated for 1 hour at 95–100° C. There was obtained liquid 1,4-dicyano-1-butene, $n_D^{25}$: 1.4640.

*Example VIII*

A mixture of 20 parts of 1,4-dicyano-2-butene and 0.2 part of diethanolamine was heated at 95–100° C. for 2 hours. The reaction product was liquid 1,4-dicyano-1-butene, $n_D^{25}$: 1.4652.

*Example IX*

A mixture of 20 parts of 1,4-dicyano-2-butene and 0.2 part of piperazine was heated for 1 hour at 95–100° C. The reaction product was liquid 1,4-dicyano-1-butene, $n_D^{25}$: 1.4663.

In the process of this invention there may be used any amine, whether primary, secondary or tertiary, having a basicity, as expressed by its $pK_a$ value at 20–25° C., between 6 and 12. In addition to the amines of the examples, there may be mentioned as suitable isomerization catalysts ethylamine, diethylamine, allylamine, n-butylamine, n-amylamine, di-n-butylamine, tri-n-butylamine, diisobutylamine, n-hexylamine, n-dodecylamine, n-hexadecylamine, n-octadecylamine, cyclohexylamine, benzylamine, N-diethylaniline, N-diethyl o- and p-toluidines, 2-methylpiperidine, 1-ethylpiperidine, ethanolamine, triethanolamine, 2-hydroxy-3-ethylpiperidine, and the like. It is essential that the amine catalyst be sufficiently basic. For example, amines such as pyridine, aniline, N-methylaniline, o-, m-, and p-toluidine, alpha- and beta-naphthylamine, etc., whose $pK_a$ is below 6 are ineffective as isomerization catalysts. On the other hand, highly basic materials such as benzyltrimethylammonium hydroxide and benzyltrimethylammonium butoxide whose $pK_a$ is around 14 are also ineffective and appear to polymerize the dicyanobutene. The preferred amines for use in this invention for reasons of economy and availability, are the aliphatic and cycloaliphatic amines of not more than eighteen carbon atoms and more preferably the alkylamines and cycloalkylamines having not more than eighteen carbon atoms.

1,4-dicyano-1-butene is of special usefulness in the preparation of adiponitrile and/or hexamethylenediamine by catalytic hydrogenation. It is also of great value as intermediate in the preparation of many other chemicals such as acids, amides, esters, etc.

As many apparently widely different embodiments of this invention may be made without departing from the spirit and scope thereof, it is to be understood that the invention is not limited to the specific embodiments thereof except as defined in the appended claims.

I claim:

1. A method for isomerizing 1,4-dicyano-2-butene to 1,4-dicyano-1-butene which comprises maintaining 1,4-dicyano-2-butene at an elevated temperature in contact with catalytic amounts of an amine having a basicity, as expressed by its $pK_a$ value at 20–25° C., between 6 and 12 until 1,4-dicyano-1-butene is formed.

2. A method for isomerizing 1,4-dicyano-2-butene to 1,4-dicyano-1-butene which comprises maintaining 1,4-dicyano-2-butene at an elevated temperature in contact with catalytic amounts of an aliphatic amine having a basicity, as expressed by its $pK_a$ value at 20–25° C., between 6 and 12 until 1,4-dicyano-1-butene is formed.

3. A method for isomerizing 1,4-dicyano-2-butene to 1,4-dicyano-1-butene which comprises maintaining 1,4-dicyano-2-butene at an elevated temperature in contact with from 0.05% to 5% of its weight of a cycloaliphatic amine having a basicity, as expressed by its $pK_a$ value at 20–25° C., between 6 and 12 until 1,4-dicyano-1-butene is formed.

4. A method for isomerizing 1,4-dicyano-2-butene to 1,4-dicyano-1-butene which comprises maintaining 1,4-dicyano-2-butene at an elevated temperature between 75° C. and 150° C. and in liquid phase contact with from 0.05 to 5% of its weight of an aliphatic amine having a basicity, as expressed by its $pK_a$ value at 20–25° C., between 6 and 12 until 1,4-dicyano-1-butene is formed.

5. A method for isomerizing 1,4-dicyano-2-butene to 1,4-dicyano-1-butene which comprises maintaining 1,4-dicyano-2-butene at an elevated temperature between 75° and 150° C., and in liquid phase contact with from 0.08 to 2% of its weight of an alkylamine of not more than 18 carbon atoms and having a basicity, as expressed by its $pK_a$ value at 20–25° C., between 6 and 12 until 1,4-dicyano-1-butene is formed.

6. A method for isomerizing 1,4-dicyano-2-butene to 1,4-dicyano-1-butene which comprises maintaining 1,4-dicyano-2-butene at an elevated temperature between 75° and 150° C., and in liquid phase contact with from 0.08 to 2% of its weight of a cycloalkylamine of not more than 18 carbon atoms and having a basicity, as expressed by its $pK_a$ value at 20–25° C., between 6 and 12 until 1,4-dicyano-1-butene is formed.

7. A method for isomerizing 1,4-dicyano-2-butene to 1,4-dicyano-1-butene which comprises maintaining 1,4-dicyano-2-butene at an elevated temperature between 75° and 150° C., and in liquid phase contact with from 0.08 to 2% of piperidine until 1,4-dicyano-1-butene is formed.

8. A method for isomeriing 1,4-dicyano-2-butene to 1,4-dicyano-1-butene which comprises maintaining 1,4-dicyano-2-butene at an elevated temperature between 75 and 150° C., and in liquid phase with from 0.08 to 2% of triethylamine until 1,4-dicyano-1-butene is formed.

9. A method for isomerizing 1,4-dicyano-2-butene to 1,4-dicyano-1-butene which comprises maintaining 1,4-dicyano-2-butene at an elevated temperature between 75° and 150° C., and in liquid phase contact with from 0.08 to 2% of morpholine until 1,4-dicyano-1-butene is formed.

CARL M. LANGKAMMERER.

REFERENCES CITED

The following references are of record in the file of this patent:

UNITED STATES PATENTS

| Number | Name | Date |
|---|---|---|
| 2,375,015 | Marple et al. | May 1, 1945 |
| 2,384,630 | Mahan | Sept. 11, 1945 |
| 2,448,755 | Zellner | Sept. 7, 1948 |
| 2,451,386 | Hager | Oct. 12, 1948 |

OTHER REFERENCES

Ingold et al., J. Chem. Soc., vol. 1936, pp. 1328–1334.